No. 686,449. Patented Nov. 12, 1901.
E. M. HACKETT.
WATER METER.
(Application filed July 15, 1901.)
(No Model.)
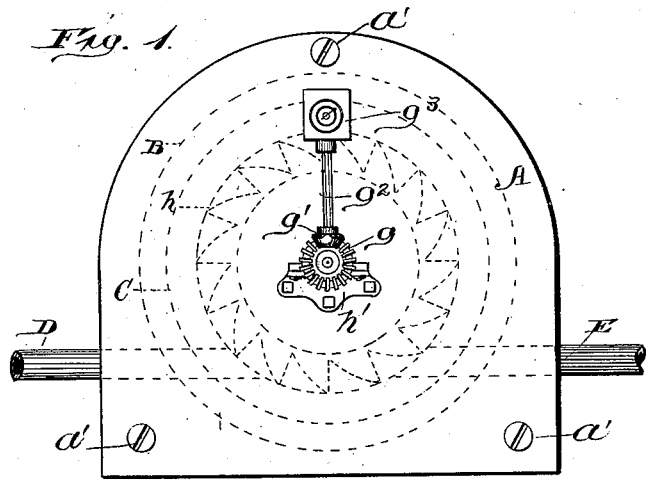
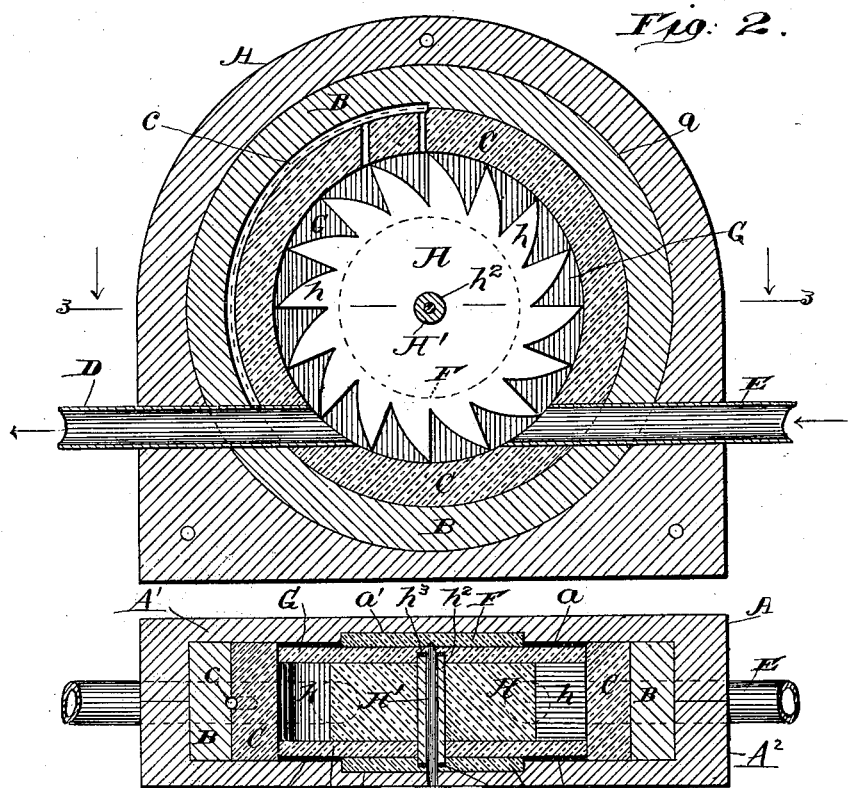
Witnesses: Chas. E. Gorton, Hattie A. Thomas
Inventor: Edward M. Hackett
By Chas. C. Tillman

UNITED STATES PATENT OFFICE.

EDWARD M. HACKETT, OF CHICAGO, ILLINOIS, ASSIGNOR OF TWO-THIRDS TO JOHN P. HARDING AND MARTIN T. MAHONEY, OF CHICAGO, ILLINOIS.

WATER-METER.

SPECIFICATION forming part of Letters Patent No. 686,449, dated November 12, 1901.

Application filed July 15, 1901. Serial No. 68,372. (No model.)

*To all whom it may concern:*

Be it known that I, EDWARD M. HACKETT, a citizen of the United States, residing at Chicago, in the county of Cook and State of Illinois, have invented certain new and useful Improvements in Water-Meters, of which the following is a specification.

This invention relates to improvements in water-meters; and it consists in certain peculiarities of the construction, novel arrangement, and operation of the various parts thereof, as will be hereinafter more fully set forth and specifically claimed.

The objects of my invention are to provide a water-meter which shall be simple and inexpensive in construction, strong, durable, effective, and accurate in operation, and shall be so constructed that there will be no portion of the metallic part of the meter exposed to the water, thus avoiding the corrosive effect thereof.

Another object of my invention is to provide ground joints for the water-wheel.

In order to enable others skilled in the art to which my invention pertains to make and use the same, I will now proceed to describe it, referring to the accompanying drawings, in which—

Figure 1 is a view in side elevation of a meter embodying my invention. Fig. 2 is a slightly-enlarged central vertical sectional view thereof, and Fig. 3 is a plan sectional view taken on line 3 3 of Fig. 2 looking in the direction indicated by the arrows.

Similar letters refer to like parts throughout the different views of the drawings.

A represents the casing, which may be made of any suitable size, form, and material, but preferably of two pieces A' and A² of metal and of the shape shown in the drawings. These pieces are hollow to form a circular cavity $a$ when they are secured together, which may be done by bolts $a'$ or otherwise, in which cavity is placed and secured a ring B, preferably of metal, and within this ring is located another ring C, which is preferably made of glass. Between the outer periphery of the ring C and the inner periphery of the ring B is formed a groove $c$, which extends from the upper portion of said rings to their lower portion and communicates with an outlet-pipe D, which passes through suitable openings in one side of the casing A and in the lower portion of the said rings. Passing through suitable openings in the opposite side of the casing A and in the lower portion of the rings B and C is a water-supply pipe E, which communicates with a source of water. (Not shown.) The inner surfaces of the walls of the cavity $a$ of the casing are provided with countersunk recesses $a'$, in which are located glass plates F, against the inner surfaces of which rest glass plates G, which are circular in form and fit snugly within the inner ring C, as is clearly shown in Fig. 3 of the drawings. Located between the plates G is a wheel H, which has a series of projections $h$, extending to the inner periphery of the inner ring C, thus forming spaces for the reception of quantities of water as the wheel rotates. Passing through the wheel and glass plates G is a spindle or shaft H', on which the wheel is mounted. One end of the shaft H' has its bearings in one of the glass plates F, and the other end thereof is journaled in a box $h'$ on the outer surface of the casing. Fitting around the shaft H' is a bushing $h^2$, which is provided at its ends with packing $h^3$, located in one of the plates F and in one of the plates G. (See Fig. 3 of the drawings.) On that end of the shaft H' which extends through the casing is mounted a gear $g$, which meshes with a pinion $g'$ on the shaft $g^2$, suitably journaled on the outside of the casing, the other end of which shaft is connected to a register or indicator $g^3$, of the ordinary or any preferred construction, and which register or indicator may be located on the side of the casing, as shown in Fig. 1 of the drawings.

The operation of the device is simple and as follows: Water is admitted through the supply-pipe E, which will cause the wheel H to rotate and through its connections with the register $g^3$ indicate the quantity of water which passes through the meter. The groove or channel $c$ between the rings B and C will retain air when the water is shut off, and as it communicates at its upper portion with the cavity in which the wheel H operates it will prevent a vacuum being formed, thus preventing the meter becoming locked when the water is again supplied thereto.

By employing my construction it is apparent that ground joints are afforded between the plates F and G and that the shaft H' will be entirely protected from the water, thus preventing it rusting or corroding. By making the wheel, inner ring, and plates G of glass it is apparent that there will be none of the metallic portion of the meter exposed to the water.

Having thus fully described my invention, what I claim as new, and desire to secure by Letters Patent, is—

1. In a water-meter, the combination with a casing having a cavity, of an inner and outer ring located therein, glass plates located on the walls of the cavity, a water-wheel located in the cavity and journaled on the casing, a glass plate located on each side of the wheel and with the first-named plates forming ground joints, and water supply and outlet pipes communicating with the cavity, substantially as described.

2. In a water-meter, the combination with a casing having a cavity and recesses in the walls thereof, of an inner and outer ring located in the cavity and having a channel between them, plates located in the recesses of the walls of the cavity, a water-wheel located in the cavity and journaled on the casing, a plate located on each side of the wheel and with the first-named plates forming ground joints, and water supply and outlet pipes communicating with the cavity of the casing, substantially as described.

EDWARD M. HACKETT.

Witnesses:
CHAS. C. TILLMAN,
HATTIE A. THOMAS.